G. MAULICK.
SAW.

No. 105,349.  Patented July 12, 1870.

WITNESSES,
Wm. A. Steel
John Parker

G. Maulick
By his Att'ys
Howson & Son

United States Patent Office.

GOTTLIEB MAULICK, OF TRENTON, NEW JERSEY.

Letters Patent No. 105,349, dated July 12, 1870.

IMPROVEMENT IN SAWS.

The Schedule referred to in these Letters Patent and making part of the same

I, GOTTLIEB MAULICK, of Trenton, county of Mercer, State of New Jersey, have invented an Improved Saw with Detachable Teeth, of which the following is a specification.

Nature and Object of the Invention.

My invention consists of a forked tooth, adapted to a tapering projection and certain shoulders on the blade, so that the tooth can be readily withdrawn and replaced.

My invention further consists of the combination of the said detachable tooth with a spring-retaining catch, so disposed of that it will form a continuation of the upper edge of the tooth.

Description of the Accompanying Drawing.

Figure 1:
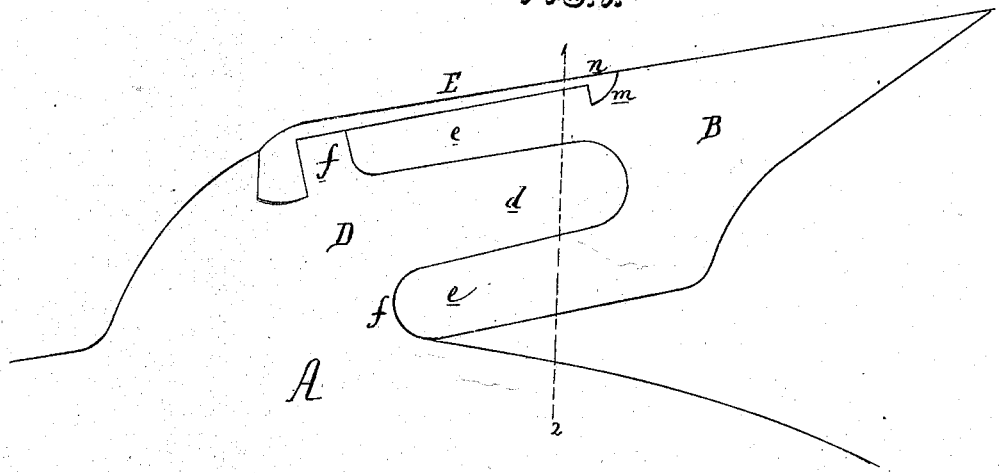
Figure 2:
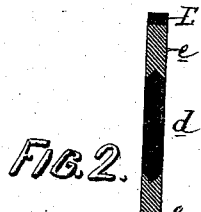

Figure 1 represents part of the blade of a circular saw with my improved detachable tooth, and Figure 2, a transverse section on the line 1 2, fig. 1.

General Description.

A represents part of the saw-blade, and

B the detachable tooth.

On the periphery of the blade are formed as many projections, D, as the saw has to be furnished with teeth, and the portion $d$ of the projection is gradually reduced in width toward its outer end, so as to have the slightly tapering form shown, the exterior end of the projection being rounded, and the whole being adapted to the tapering recess of the tooth D, so that when the latter is fitted to its place, the ends of the prongs $e\ e$ will bear against shoulders $f\ f$ on the projection D; the rounded ends of the portion $d$ of the latter bearing against the ends of the recess in the tooth.

A V-shaped groove, shown in fig. 2, is formed in the edges of the recess of the tooth and in the ends of the prongs to receive the U-shaped rib formed in all parts of the edge of the projection D, with which the tooth is brought into contact.

A notch, $m$, is formed in the upper edge of the tooth to receive the end $n$ of the spring catch E, the tooth being recessed to receive this spring, so that the upper edge of the latter will form a continuation of the upper edge of the tooth.

The spring terminates at the rear, in a dovetailed enlargement, fitted and secured into a dovetailed recess in the projection D of the blade.

The tooth can be readily removed after raising the end of the spring catch, and the latter will be self-adjusting to its proper position on fitting the tooth to the projection, and will effectually retain the tooth in its place.

Claim.

The combination of the forked tooth B, tapering projection on the saw-plate A, and spring E, all constructed and arranged substantially as described.

In testimony whereof I have signed my name to this specification in the presence of two subscribing witnesses.

GOTTLIEB MAULICK.

Witnesses:
WILLIAM F. GUNSSER,
CHARLES PRESBER.